(12) United States Patent
Kim et al.

(10) Patent No.: US 11,995,403 B2
(45) Date of Patent: May 28, 2024

(54) TEACHING A MACHINE CLASSIFIER TO RECOGNIZE A NEW CLASS

(71) Applicant: ADOBE INC., San Jose, CA (US)

(72) Inventors: Sungchul Kim, San Jose, CA (US); Subrata Mitra, Bangalore (IN); Ruiyi Zhang, Santa Clara, CA (US); Rui Wang, Durham, NC (US); Handong Zhao, San Jose, CA (US); Tong Yu, San Jose, CA (US)

(73) Assignee: ADOBE INC., San Jose, CA (US)

(*) Notice: Subject to any disclaimer, the term of this patent is extended or adjusted under 35 U.S.C. 154(b) by 331 days.

(21) Appl. No.: 17/524,282

(22) Filed: Nov. 11, 2021

(65) Prior Publication Data
US 2023/0143721 A1    May 11, 2023

(51) Int. Cl.
*G06F 40/295* (2020.01)
*G06N 20/00* (2019.01)

(52) U.S. Cl.
CPC ........... *G06F 40/295* (2020.01); *G06N 20/00* (2019.01)

(58) Field of Classification Search
None
See application file for complete search history.

(56) References Cited

U.S. PATENT DOCUMENTS

2020/0104643 A1* 4/2020 Hu .................... G06N 3/045
2021/0374347 A1* 12/2021 Yang ................. G06F 40/295

* cited by examiner

*Primary Examiner* — Quynh H Nguyen
(74) *Attorney, Agent, or Firm* — Shook, Hardy & Bacon L.L.P.

(57) ABSTRACT

Embodiments of the technology described herein describe a machine classifier capable of continually learning new classes through a continual few-shot learning approach. A natural language processing (NLP) machine classifier may initially be trained to identify a plurality of other classes through a conventional training process. In order to learn a new class, natural-language training data for a new class is generated. The training data for the new class may be few-shot training data. The training also uses synthetic training data that represents each of the plurality of other classes. The synthetic training data may be generated through a model inversion of the original classifier. The synthetic training data and the natural-language training data are used to retrain the NLP classifier to identify text in the plurality of other classes and the new class using.

14 Claims, 10 Drawing Sheets

TEACHING A MACHINE CLASSIFIER TO RECOGNIZE A NEW CLASS

BACKGROUND

Named Entity Recognition (NER) is a common natural language processing (NLP) task that extracts entities from unstructured text data. Existing NER models are usually trained on a large-scale dataset with predefined entity classes. Once trained, the model is able to assign a class to entities in natural language text without further adaptation. However, in the real world, the classification task is often evolving as new data classes are developed. The originally trained NER model is not able to classify the data into newly developed entity classes that are not initially available during the model training. It is a technical challenge to teach the classifier to learn new classes without degrading the accuracy when classifying the data of old classes (i.e., avoid catastrophic forgetting). One current approach to this problem is to add annotated training data for the new class to the original large-scale dataset containing training data for the old class. This approach requires preserving the original training data over time and generating a large number of annotated training instances for the new class. There is a need to teach a machine classifier a new class of data without preserving the original training set and without generating a large number of training instances for the new class.

SUMMARY

Embodiments of the technology described herein include a machine classifier that is able to learn new classes with a minimal amount of new training instances for the new classes. In one aspect, the minimal amount of training instances for the new class is less than 50%, 25%, 10%, or 5% of the per-class amount of training instances in the original training set used to train the machine classifier. The technology described herein uses a continual few-shot learning approach to learn new classes. To target the problem of catastrophic forgetting in continual few-shot learning, the technology described herein reconstructs synthetic training data of the old classes from the NER model. Constructing synthetic training may eliminate the need to access or store the original training data. The synthetic training data may comprise a representative number of training instances for each existing class. A model is then retrained using the synthetic training data and training data for the new class. The new model is then used to identify data in the old classes and the new class.

DETAILED DESCRIPTION

Figure 1:
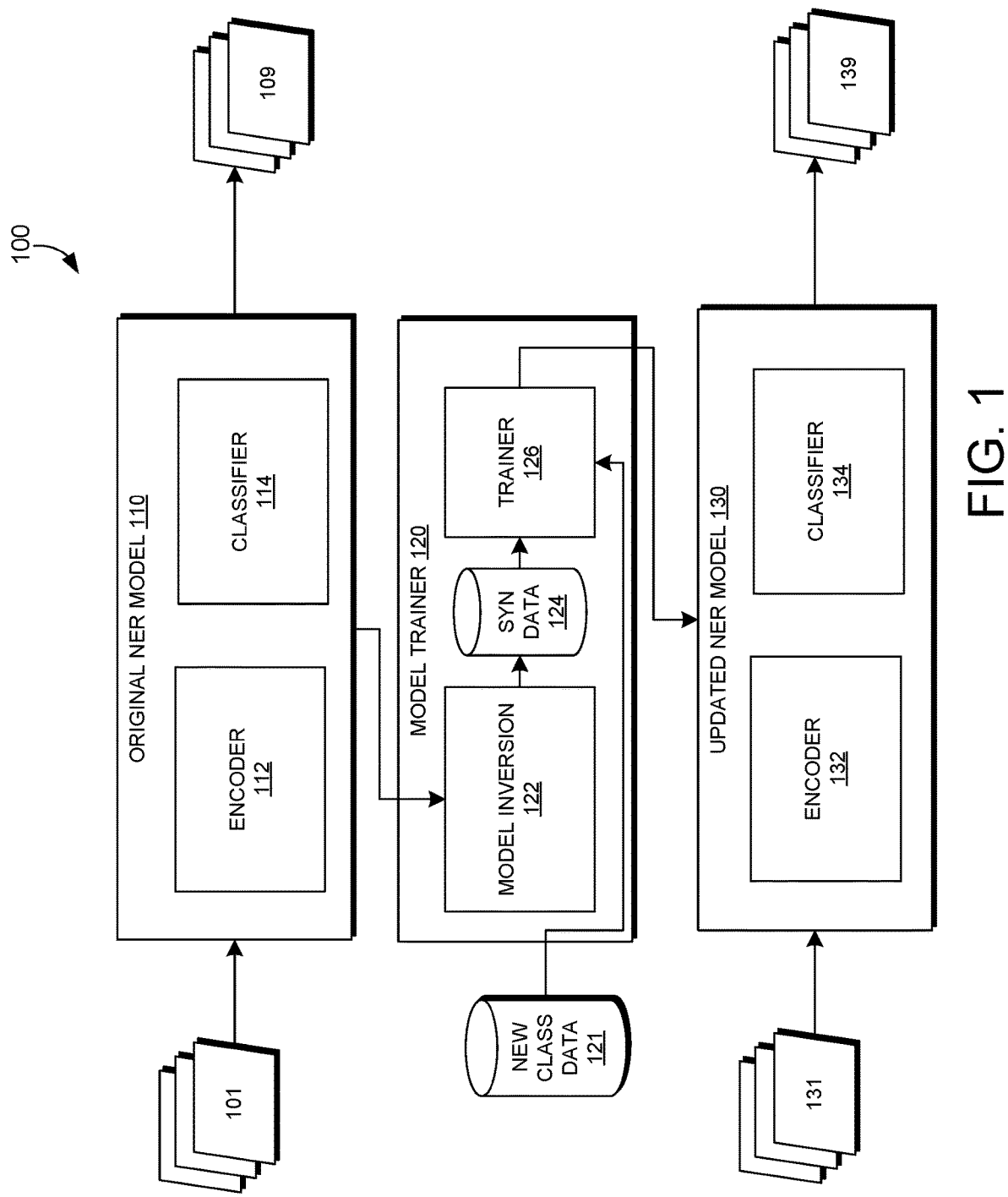
FIG. 1 is an illustration of a work flow for using continual few-shot learning with a NER model, in accordance with embodiments of the technology described herein.

Machine classifiers regularly encounter new categories of information that are not recognizable to the machine classifier without updated training. Continually training machine classifiers to recognize new categories of information is resource intensive and can create data security concerns in some implementations. Currently available methods of training machine classifiers to recognize new categories of information involves adding training instances directed to the new category of information to the original training data set (or a comparable set) and retraining. This method requires storage of the original training data set for long time periods and generation of comparatively large training data sets for the new category of information. It is desirable to train a machine classifier to learn new categories without storing the original training data and without generating large amounts of new training data for the new category (i.e., class).

The technology described herein uses a continual few-shot learning approach to teach a machine classifier to identify a new class of objects, such as entities. Initially, the machine classifier is able to recognize a plurality of classes. The continual few-shot learning approach starts by generating synthetic training data from the machine classifier through a model inversion process. The synthetic training data represents all of the classes the previously trained machine classifier is able to recognize. The synthetic training data may take the form of a machine embedding and a corresponding class label identifying one or more classes associated with the machine embedding. The synthetic training data may include multiple machine embeddings for each existing class. A new version of the classifier is then trained using the synthetic training data and natural-language training data provided for the new class. The natural-language training data may comprise a sentence and a sentence label that identifies a word within the sentence that is in the new class. The sentence label may also identify one or more words in the sentence that are in the existing classes. Once trained, the newly trained machine classifier may classify words into the new class and the plurality of classes the machine classifier was initially able to recognize.

Use of a continual few-shot learning approach to teach a machine classifier to recognize a new class improves storage efficiency, data privacy, computer resource efficiency during training, and training data generation efficiency for the new class. The continual few-shot learning approach improves storage efficiency and data privacy by eliminating the need to store the original natural language training data used to train the machine classifier to recognize an initial group of classes. In the prior art, the initial natural language training data could be stored and then combined with new training data for the new class to retrain the classifier. The use of synthetic training data to represent the initial natural language training data during re-training eliminates the need to store the initial training data. Eliminating the need to store the initial training data improves data privacy by eliminating a possibility that information in the training data could be accessed by accessing the model training system. Training data may be generated from corporate documents to train a classifier to identify classes of entities that are specific to the corporation. It is desirable prevent access to the corporate documents. Eliminating copies of the corporate documents from the model training system (the documents may be maintained in storage from which they were copied during the training-data generation process) eliminates one point of potential access to the documents.

The use of continual few-shot learning improves the training efficiency by reducing an amount of training instances needed for the new class. The use of fewer training instances reduces the resource usage needed to generate training samples, which can include manual labeling efforts. The synthetic training data may have far fewer per-class instances than the original natural language training data. The natural language training data provided for the new class may contain a similar amount of new-class instances as the synthetic training data. Thus, amount of new-class instances may be far fewer than the per-class instance amount from the original natural-language training data. In general, the amount of computer resource (e.g., GPU and CPU) usage is proportional to the amount of training data instances, all else being equal. Thus, the continual few-shot learning approach to teaching a classifier a new class uses less computer resources than conventional training.

The technology described herein teaches an existing machine classifier to recognize new classes through few-shot learning. The existing machine classifier may be trained to identify a first plurality of classes from conventional training data. The conventional training data may include a sentence with a training label that associates words in the sentence with no class or one of the classes in the first plurality of classes. Once trained, the initial version of the machine classifier is able to classify words in unlabeled sentences into the plurality of classes. The conventional training data may include a large number of training instances for each class to be learned.

To target the problem of catastrophic forgetting in continual few-shot learning, the technology described herein reconstructs synthetic training data of the old classes from the NER model. Constructing synthetic training may eliminate the need to access or store the original training data. The synthetic training data may comprise a representative number of training instances for each existing class. A model is then retrained using the synthetic training data and training data for the new class. The new model is then used to identify data in the old classes and the new class.

The technology described herein solves various problems encountered when trying to use few-shot learning to train a classifier for NER. For example, compared to continual learning, the few-shot dataset in continual few-shot learning may not contain enough information for the trained model to generalize during testing. As another example, compared to continual learning, it is more challenging to solve the catastrophic forgetting problem in continual few-shot learning. In continual learning for NER, the same training sentence may contain entities of different types. Therefore, when the training dataset for new classes is sufficiently large, its context, i.e., words labeled as not from entities of new classes, will also contain many entities of the old classes. That is, the new training data can be regarded as an unlabeled replay dataset of the previous entity classes. Replay (sometimes described as experience replay) uses a classifier's previously processed inputs and outputs as a training input for a new model. Thus, the replay data may include text that was classified along with the classification assigned by the model. With such a replay, the problem of catastrophic forgetting can be addressed by distilling from the previous model. However, in continual few-shot learning, replay with the few samples from the new training data will not be effective training data, where entities of the old classes may not be included in the new training data.

To address the above two challenges, the technology described herein provides a framework to enable continual few-shot learning for NER. Since there may not be enough data samples from old classes for replay, the technology described herein uses a generative synthetic replay via data reconstruction of the old classes. The technology described herein considers generating synthetic data samples of old classes by inverting the NER model. Specifically, given the previous model that has been trained on the old classes, the token embeddings of the synthetic data are optimized so that its prediction from the previous model contains the old entity classes. To ensure the reconstructed data is realistic (meaning it replaces actual training data), the technology described herein adverserially matches the hidden features of tokens from the synthetic data and those from the training text of new classes. In addition, since the reconstructed data from a model trained with only few samples are noisy, data selection on the reconstructed dataset is conducted to ensure its quality. By the framework, the technology described herein trains the NER model with annotations of the new classes, while distilling from the previous model with both the synthetic data and real text from the new training data.

The technology described herein is a continual few-shot training method for a natural language model. The training method can be repeated to teach a classifier multiple new classes. Each training iteration may use a few-shot training set dedicated to the new class being taught in the iteration. Traditionally, few-shot learning approaches can cause catastrophic forgetting that prevents the new model from accurately identifying previously learned classes. In order to prevent catastrophic forgetting, the training method described herein generates synthetic training data from the existing version of the model. The synthetic training data comprises a synthetic embedding and a label the existing model would assign to the embedding. The synthetic training data is generated to include a representative amount of training data for each class the existing model has learned. The synthetic training data representing existing classes and the few-shot training data representing the new class are combined through a distillation training process to train the new version of the model. The new version is then be used in production to recognize the new class and the old classes.

Continual Few-Shot Learning Environment

Turning now to FIG. 1, a high-level NER model with continual few-shot learning environment 100 is shown, in accordance with implementations of the present disclosure. The environment 100 includes an original NER Model 110, a model trainer 120, and the updated NER Model 130. The few-shot learning environment 100 operates on one or more computing devices that may include client-side devices and server-side devices. In aspects, operations may be split between client-side devices and server-side devices. Further, the components shown may interact with computing devices not shown in FIG. 1, such as user devices. For example, various user interfaces generated by, or with information generated by the components shown, may be displayed on a user device, such as a laptop.

The arrangements described herein are set forth only as examples. Other arrangements and elements (e.g., machines, interfaces, functions, orders, and groupings of functions, etc.) may be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions are carried out by a processor executing instructions stored in memory.

Moreover, these components, functions performed by these components, or services carried out by these components are implemented at appropriate abstraction layer(s), such as the operating system layer, application layer, hardware layer, etc., of the computing system(s). Alternatively, or in addition, the functionality of these components and/or the embodiments of the technology described herein are performed, at least in part, by one or more hardware logic components. For example, and without limitation, illustrative types of hardware logic components include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein regarding specific components shown in example environment 100, it is contemplated that in some embodiments functionality of these components are shared or distributed across other components.

Through not shown, a user device is any type of computing device capable of use by a user. For example, in one embodiment, a user device is of the type of computing device described in relation to FIG. 10 herein. In various embodiments, a user device is a personal computer (PC), a laptop computer, a mobile or mobile device, a smartphone, a tablet computer, a smart watch, a wearable computer, a virtual reality headset, augmented reality glasses, a personal digital assistant (PDA), an MP3 player, a global positioning system (GPS) or device, a video player, a handheld communications device, a gaming device or system, an entertainment system, a vehicle computer system, an embedded system controller, a remote control, an appliance, a consumer electronic device, a workstation, or any combination of these delineated devices, or any other suitable device.

The technology described herein will be described in the context of named-entity recognition. Named-entity recognition (NER) (e.g., entity extraction) is form of information extraction that seeks to locate and classify named entities mentioned in unstructured text into pre-defined entity classes, such as person names, organizations, locations, time expressions, quantities, monetary values, and the like. Thus, the starting input to a NER system may be unstructured text, such as might be found in an article or document, and the output of the NER system may be a labeled version of the unstructured text where entities are identified into an entity class. While the invention is described in the context of a NER model herein, the technology may be applied to other text classification problems.

Figure 2:
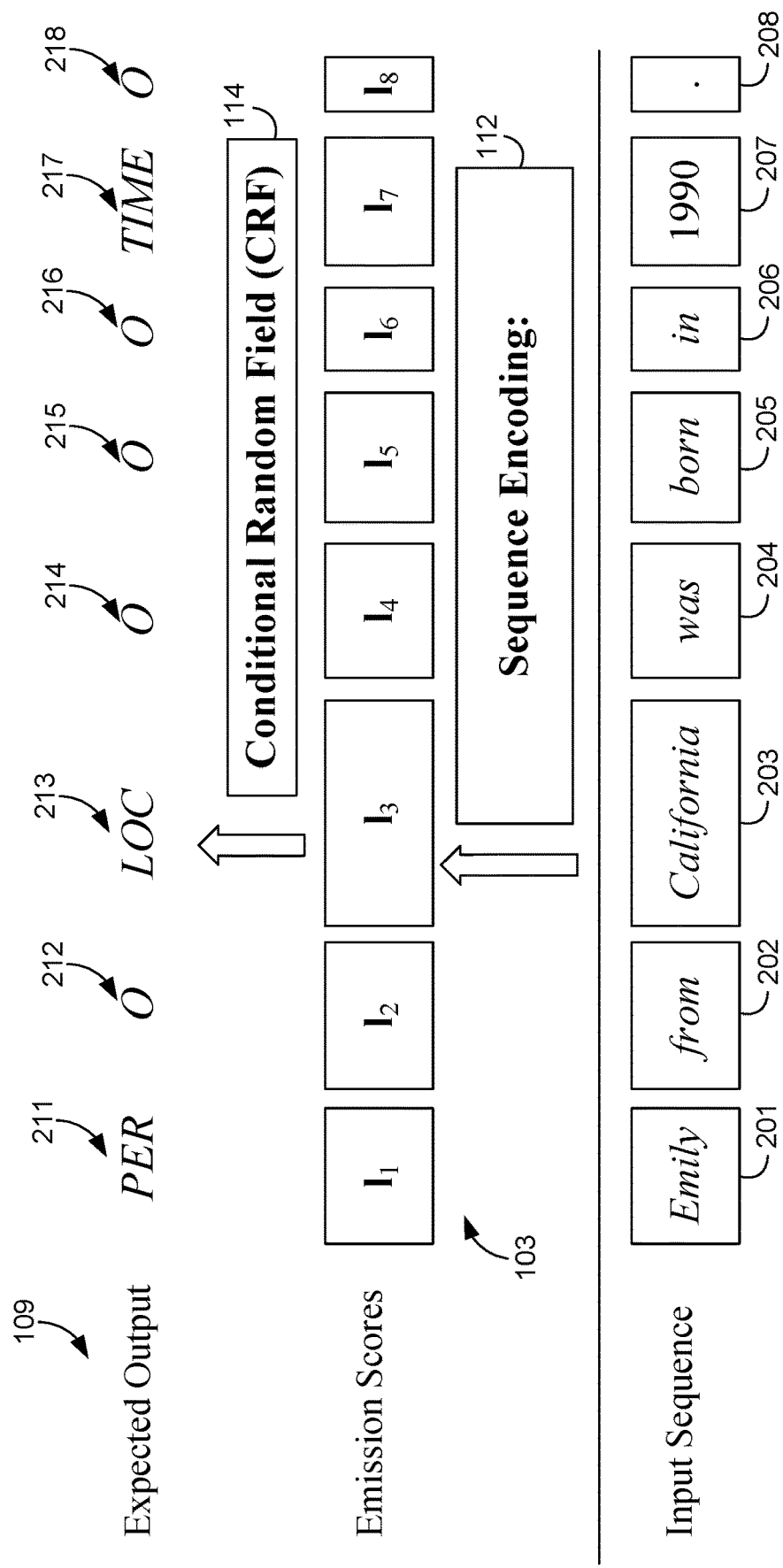
FIG. 2 provides a block diagram of a NER model, in which embodiments described herein may be employed.

The continual few-shot learning of the technology described herein adds classes to a trained NER model, such as original NER model 110. The trained NER model may be trained using conventional training methods that do not use few-shot learning. The technology described herein teaches the trained NER model to recognize additional classes. The original NER model 110 is able to receive natural language text 101 and assign a classification 109 to entities within the natural language text. The original NER model 110 includes an encoder 112 and a classifier 114. The updated NER model also includes an encoder 132 and a classifier 134. An exemplary architecture for the NER model is detailed in FIG. 2. As shown in FIG. 2, the model architecture for the original model 110 or updated model 130 may consist of a $BERT_{base}$ encoder 112 with a linear projection and a Conditional random field (CRF) layer (114 or 134) for prediction. BERT is an acronym for Bidirectional Encoder Representations from Transformers. CRFs are a class of statistical modeling methods used for structured prediction. In the NER model, the structured prediction is assigning a class or no class to each word or token in an unstructured text. The encoder 112 receives a text (or token) string 101 and outputs emission scores 103, which are a representation of the likelihood of the word being a certain class. The emission scores 103 are received by the CRF layer 114, which generates the label tag for each word. The label tag may be described as a transition score, which is the likelihood of a word being a certain tag considering the previous word was a certain tag.

In this example, the text string includes eight tokens. The CRF layer outputs a label sequence 109 that also comprises eight labels. The label PER 211, represents person, and corresponds with the token "Emily" 201 from the input sequence 101. The label "O" 211, represents an unrecognized entity, and corresponds with the token "from" 202 from the input sequence 101. The label "LOC" 212, represents location, and corresponds with the token "California" 203. The label "O" 214, represents an unrecognized entity, and corresponds with the token "was" 204. The label "O" 215, represents an unrecognized entity, and corresponds with the token "born" 205. The label "O" 216, represents an unrecognized entity, and corresponds with the token "in" 206. The label "TIME" 217, represents a time, and corresponds with the token "1990" 207. The label "O" 218, represents an unrecognized entity, and corresponds with the token "." 208.

The original NER model 110 represents a version of the NER model that has been trained to learn a first amount of classes c at a first point in time t. The original model is trained using an original dataset $D^1$ containing data sets that include a NER token string X and corresponding label sequence Y. The NER token string may be a sentence, phrase, or other group of words. The label sequence may assign a class label to words in a class, while a zero is assigned to words within the token string that do not belong to an entity class. The model trainer 120 uses additional training 121 datasets $D^2$, $D^3$, $D^4$ to train an updated NER model 130 to identify additional classes that are not in the original classes. The updated NER model 130 may have the same architecture as the original model 110, but the model parameters are updated during training to recognize the new class along with the original classes. As described in more detail, the original dataset $D^1$ is not used during the subsequent training. Instead, a synthetic training dataset 124 is used to retrain the new version of the model on previously learned classes. The model inversion component 122 generates the synthetic training dataset 124. The trainer 126 uses the synthetic data and new dataset 121 to train the updated model 130. Once trained, the updated model is able to receive unstructured text and assign class labels 139 to entities in the unstructured text.

Figure 3:
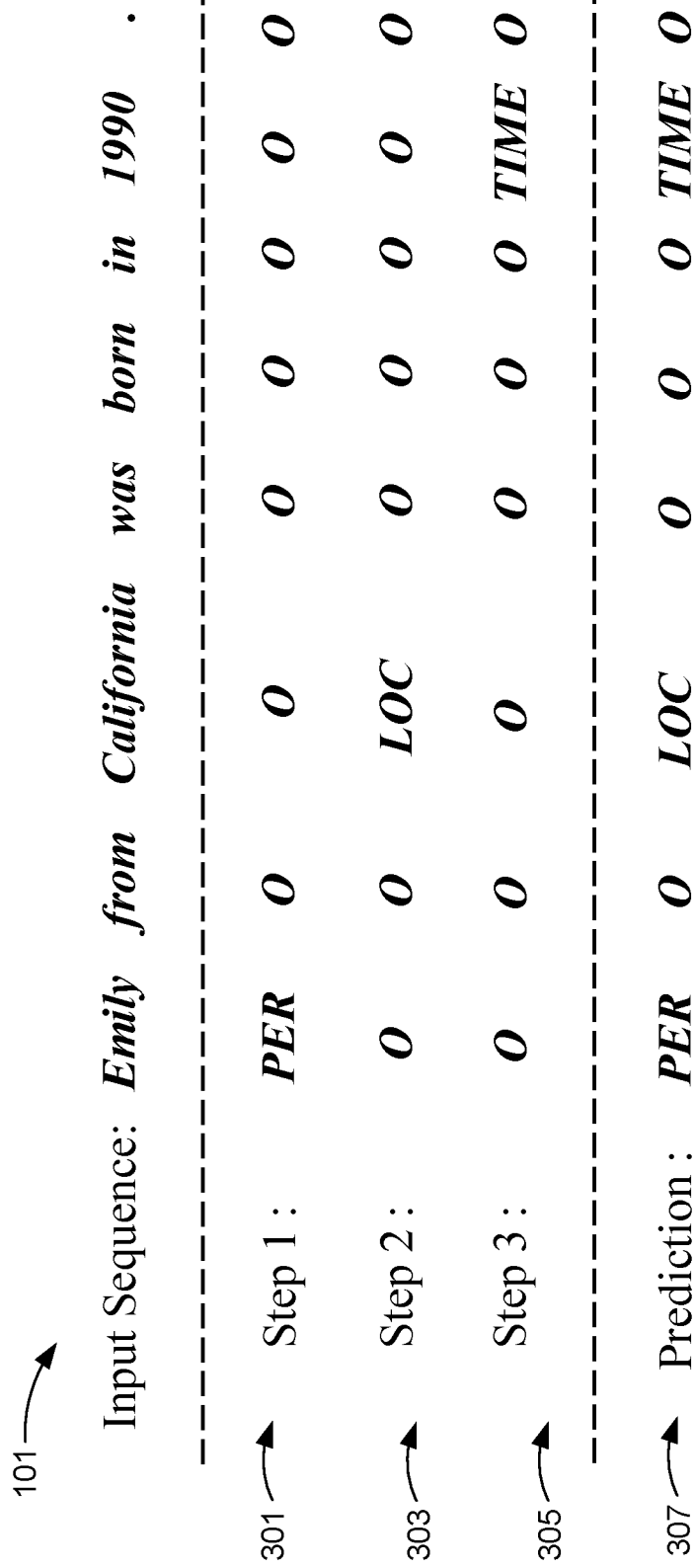
FIG. 3 is an illustration of few-shot learning training, in accordance with embodiments of the technology described herein.

The training process may be repeated with a series of datasets. In each training iteration, a new class may be learned while previously learned classes are retained through use of the synthetic training data 124. For example, FIG. 3 illustrates continually few-shot training on classes of PER, LOC, and TIME. After being trained with the original dataset $D^t$, at step 1 the model is able to classify Emily as a person. The label sequence 301 in the original dataset includes a label for person, but not location or time. The original dataset does not include the location or time class. While only the person class is shown in step 1, the original dataset can include multiple classes. At step 2, a second dataset is used to train the model to recognize the location. The second label sequence 303 includes the location tag for California. The second dataset is a few-shot dataset that would be used in combination with a synthetic dataset that includes person examples and labels. In step 3, a third dataset is used to train the model to recognize time classes. The third label sequence 305 includes the time tag for 1990. The third dataset is a few-shot dataset that would be used in combination with a synthetic dataset that includes person examples and labels and location examples and labels. Once trained at step 3, the final prediction 307 correctly labels the person, location, and time entities in the input sequence.

A dataset may include both input tokens and corresponding labels for the tokens. This may be true of both the original dataset and subsequent few-shot datasets used to train the model on new classes. A given dataset may be described as, $$D^t = \{(X_i^t, Y_i^t)\}_{i=1}^{|D^t|}, t \geq 1$$

and contain $c^t$ classes. $X_i^t[x_{i,1}^t, \ldots, x_{i,N}^t]$ and $y_i^t = [y_{i,1}^t, \ldots, y_{i,N}^t]$ are the NER token sequences and label sequences, respectively, with length N. In other word, the token sequence has an equal amount of tokens as the label sequence has labels. $D^1$ represents the original dataset with a reasonably large scale for the original classes. $\{D^t\}_{t \geq 1}$ (e.g., $D^2$, $D^3$, $D^4$) are the few-shot datasets with K samples for each class. In continual few-shot learning, the NER model will be incrementally trained with $D^1$, $D^2$, ... over time, with data from $D^t$ only available at the $t^{th}$ time step. Datasets from previous training iterations (e.g., t−1, t−2) may not be used at time t.

Training updates the model parameters to make an inference (or prediction) that is consistent with the training data. Thus, original model encoder 112 and update model encoder 132 may have the same architecture, but still be different encoders because each has unique parameters that are established during training with different data sets. The original model classifier 114 and the updated model classifier 134 may also have the same architecture, but different parameters because of different trainings data.

The technology described herein may produce a series of models, with each updated model able to identify at least one additional class. A model may be used in production until a decision is made to add a new class. FIG. 1 illustrates this process by including both the original model 110 and the updated model 130. Let $M^t$ denote the original NER model 110 for step t. Let $X=[x_{i,1}^t, \ldots, x_{i,N}^t]$ and $Y=[y_{i,1}^t, \ldots, y_{i,N}^t]$ be the $i^{th}$ input and label sequences of $D^t$, which is the dataset used at step t. $C^t$ is the number of possible labels for any given token in NER at step t, i.e., $C=\Sigma_{k=1}^t c^t$. Assume that $h(X)=[h(x_{i,1}^t), \ldots, h(x_{i,N}^t)]$ are the hidden states with dimension d from the output of the $BERT_{base}$ encoder 112 for X. Then h(X) is projected into the emission scores 103 $l(X)=[l(x_{i,1}^t), \ldots, l(x_{i,N}^t)]$ via the following linear projection:

$$l(x_{i,j}^t) = w^t * h_{i,j}^t + b^t. \tag{1}$$

Where $w \in R^{C \times d}$ and $b^t \in R^C$ are parameters of the projection of step t, with each row corresponds to a token class. Given l(X), the CRF 114 generates a probability for predicting the entire label sequence 101 Y, i.e., $p_{M^t}(Y|X)$. In continual learning with step t>1, the model $M^t$ is initialized from $M^{t-1}$ to preserve the knowledge of the previous entity classes. Thus, the second model $M^2$ is initialized using model $M^1$.

The model trainer 120 includes a model inversion component 122 and a trainer 126. The model inversion component 122 builds synthetic training data. The trainer 126 trains the updated model 130 using the distillation described subsequently. FIG. 1 shows the model trainer 120 training a subsequent model using synthetic data 124. Synthetic data may not be used for the initial model training. For time step t=1, a pretrained $BERT_{base}$ may be used as the encoder with the other parameters randomly initialized. For t>1, let $M^t$ and $M^{t-1}$ be the NER model from step t and t−1, respectively. Assume $M^{t-1}$ has been trained on $D^{t-1}$. The $BERT_{base}$ encoder of $M^t$ may be directly initialized from that of $M^{t-1}$. Since the parameters of w, b and the transition matrix of the CRF are class correspondent, the updated model is initialized from the previous model $M^{t-1}$ if the associated classes of the parameters are also valid for $M^{t-1}$, otherwise the updated model may be randomly initialize from scratch.

A key challenge solved by the technology described herein is training the model on a new class without forgetting the previous class. For time step t>1, the model $M^t$ is expected to learn about the new classes from $D^t$, while not forgetting the knowledge from $\{D^k\}_{k=1}^{t-1}$. Initially, a synthetic dataset $D_r^t = \{E_i^{t,r}, Y_i^{t,r}\}_{i=1}^{|D_r^t|}$ representing previous entity classes is generated from $\{D^k\}_{k=1}^{t-1}$ where $E_i^{t,r} = [e_{i,1}^{t,r}, \ldots, e_{i,N}^{t,r}]$ and $Y_i^{t,r} = [y_{i,1}^{t,r}, \ldots, y_{i,N}^{t,r}]$ are the reconstructed token embeddings and reference label sequence. $Y_i^{t,r}$ contains classes learned by the $M^{t-1}$ model from the previous steps and $E_i^{t,r}$ is optimized so that the output from $M^{t-1}$ with $E_i^{t,r}$ matches $Y_i^{t,r}$. Thus, the synthetic dataset comprises embeddings and corresponding labels. This contrasts with the original dataset and few-shot datasets, which both comprise token strings and label sequences, rather than embeddings and label sequences.

Figure 4:
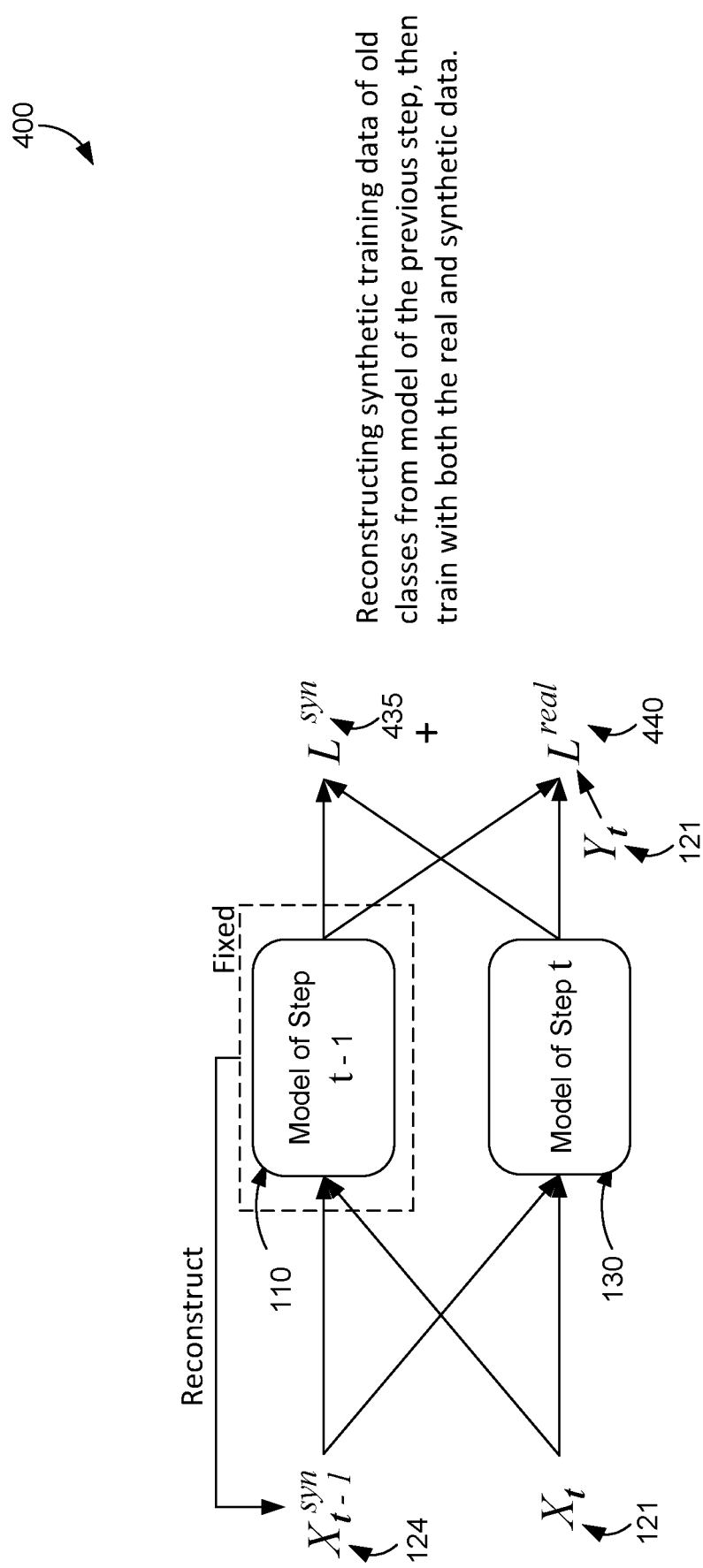
FIG. 4 is an illustration showing the generation of synthetic training data, in accordance with embodiments of the technology described herein.

The overview of the training and generation of synthetic training data is illustrated in FIG. 4. The original model 110 is used to reconstruct emeddings 124 that would produce a known label $Y^{syn}$. The distillation feeds the synthetic embeddings 124 into the original model 110 and the updated model 130. The updated model 130 is trained by updating the parameters of the updated model until the loss measured between the result of the original model 110 and the updated model 130 is minimized. In other words, the updated model 130 is trained to produce a label sequence similar to that produced by the original model 110 in response to the synthetic embedding. The process is repeated with the natural language training data, which is input to both models. The updated model is trained to reduce differences between the output generated by the two models in response to the natural language data.

Figure 5:
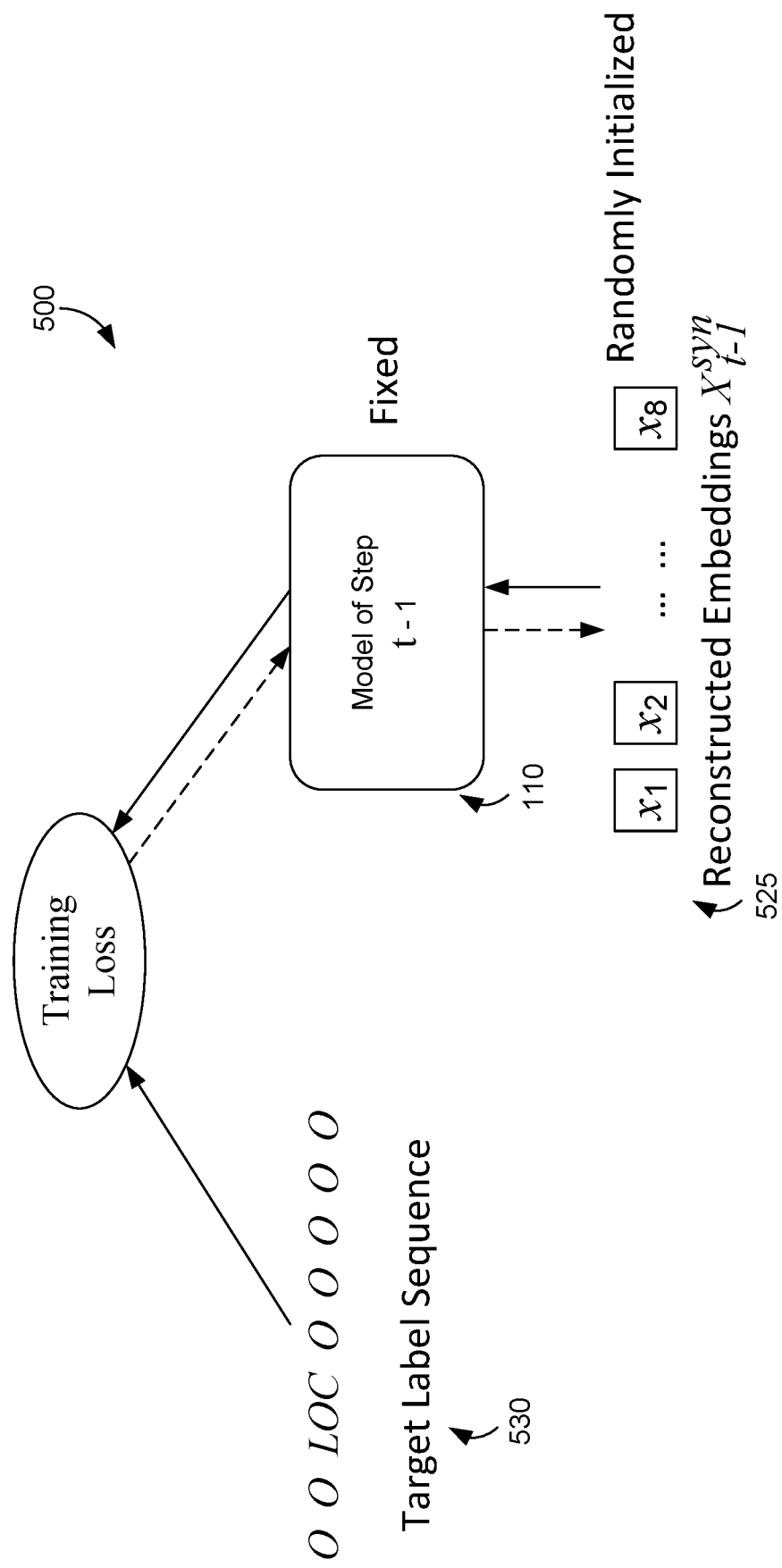
FIG. 5 is an illustration showing the generation of synthetic training data, in accordance with embodiments of the technology described herein.

FIG. 5 illustrates the generation of synthetic training data. First, a target label sequence 530 is randomly selected. Next, the original model 110 is fed randomly initialized embedding values. The randomly initialized values are updated to reduce the training loss until the reconstructed embeddings 525 are determined. The reconstructed embeddings 525 should produce the target label sequence when processed by the original model 110.

Given the new training data 121 (e.g., $D^t$) and the original model 110 $M^{t-1}$ that has been trained on the original dataset $D^{t-1}$, the model trainer 120 trains the updated model 130 $M^t$ by distilling from the original model 110 ($M^{t-1}$) with both $D^t$ and $D_r^t$. The new training data 121 may be few-shot training data and include 5, 10, 15, 20, 25 or some other relatively few amount of training data instances. The few-shot amount may be significantly fewer than amount of training instances in the original training data, which may comprise 10,000 or more training data instances. The synthetic training data may comprise more instances than the few-shot training data. For example, the synthetic training data may comprise 100, 150, 200, 300, or more training data instances. It may be desirable to increase the amount of synthetic training data instances as the amount of classes the NER is able to recognize increases. Distillation is the process of transferring knowledge from one model to another. A challenge of such distillation when learning a new class is that the predictions from $M^t$ and $M^{t-1}$ contain different label sets. The update model will have at least one class that the original model did not have. This is different from the standard setting of distillation, where the teacher and student models share the same label space. The problem of label space inconsistency is solved by the technology described herein by the use of separate approaches for distillation of $D^t$ and $D_r^t$, respectively.

Figure 6:
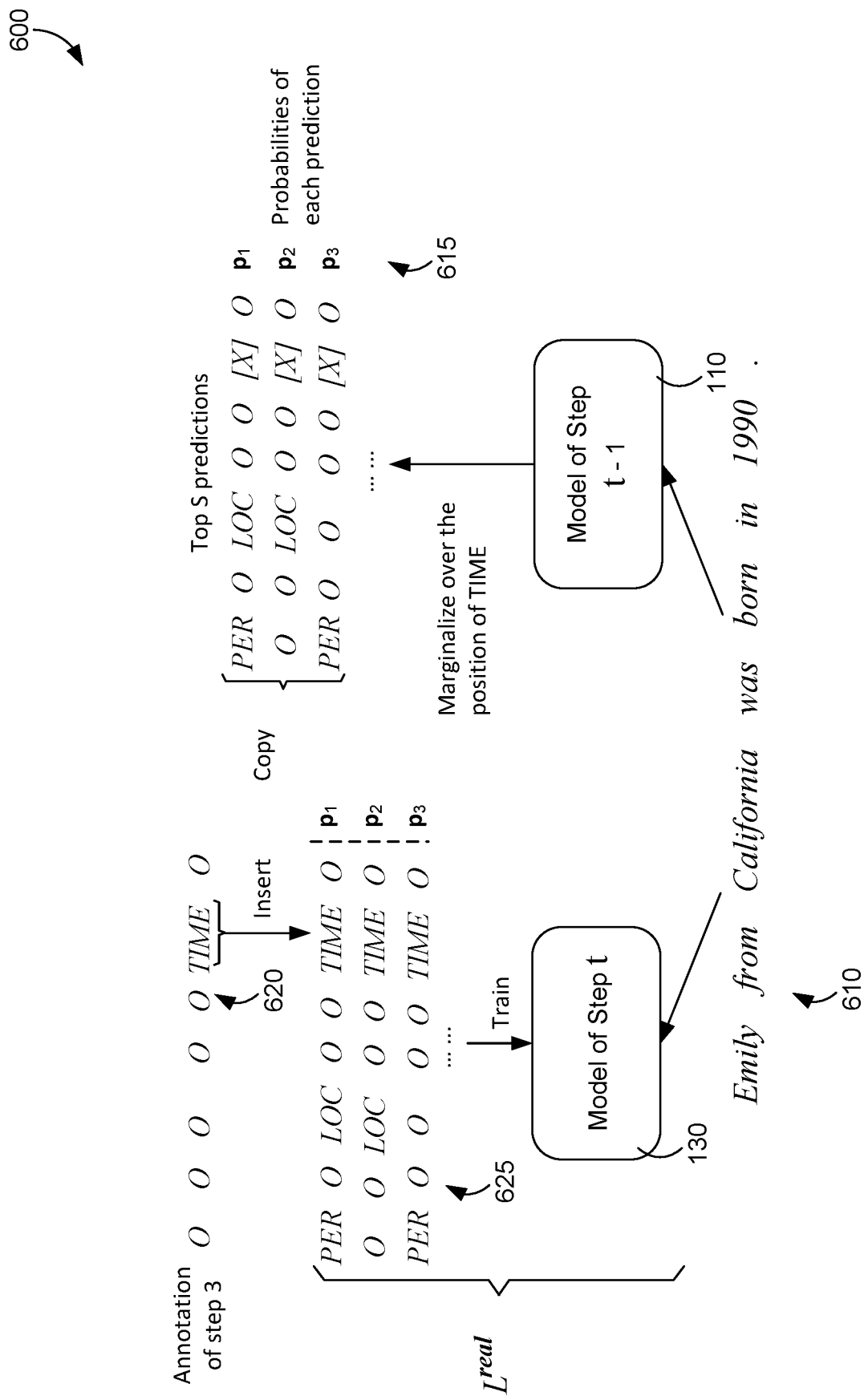
FIG. 6 is an illustration showing a model being trained to recognize a new class, in accordance with embodiments of the technology described herein.
Figure 8:
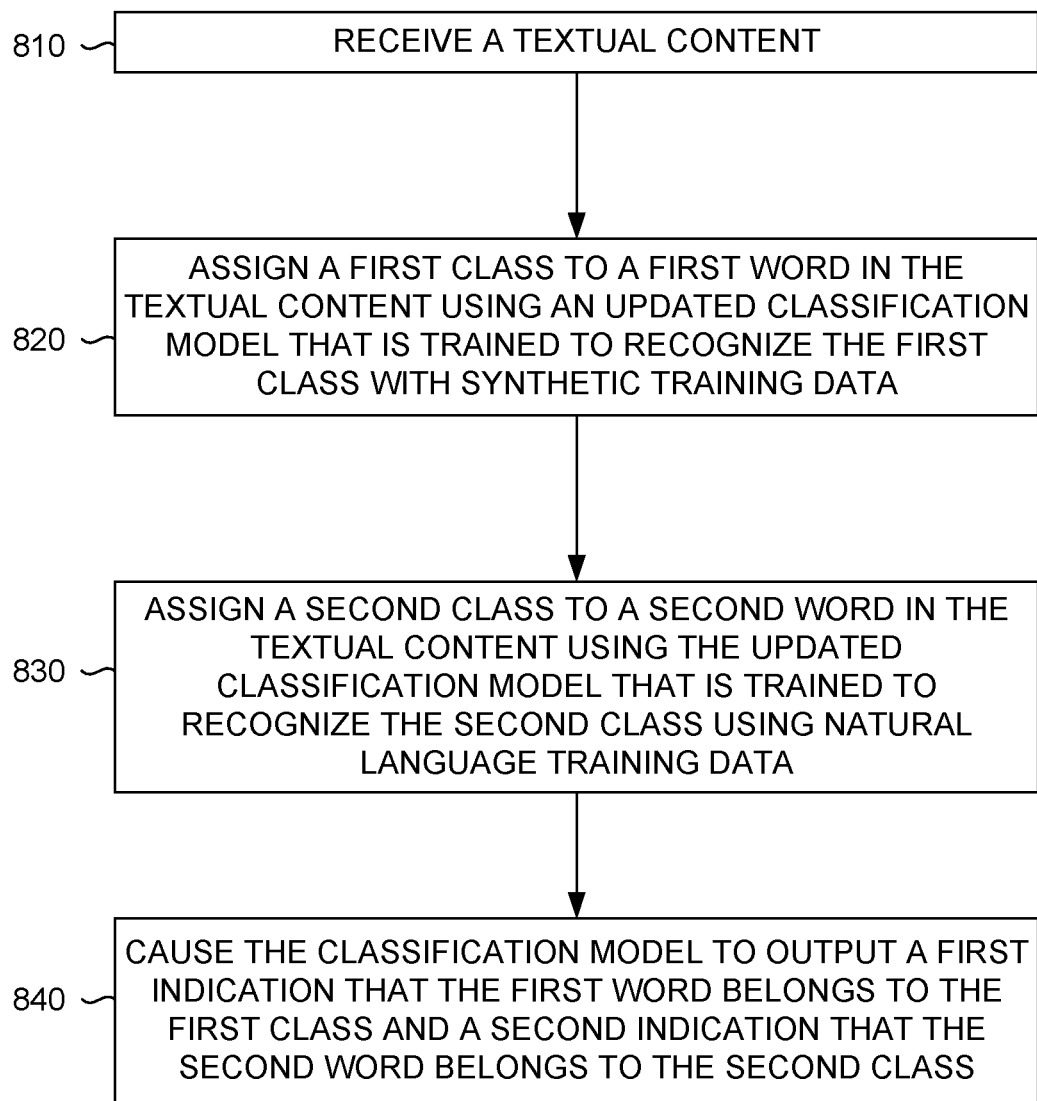
FIG. 8 provides an example method of classifying a textual object using a machine classifier to trained with synthetic training data, in accordance with embodiments of the technology described herein.

The distillation from $M^{t-1}$ to $M^t$ involves matching the output probability distributions between $M^t$ to $M^{t-1}$. A probability distribution provides a probability that an input maps to each of a set of classes, rather than only outputting the most likely class. However, given an input sequence X from $D^t$, the CRF layer outputs correspond to a sequence-level distribution $P_e(Y|X)$, i.e., probabilities for all possible label sequences of X, the cardinality of which grows exponentially large with the length of X. Therefore, it is infeasible to match with the exact output distributions of CRF. The trainer 120 approximates the sequence-level output distribution of CRF with only its top S predictions. Specifically, for model $M^{t-1}$, $$\hat{P}_{M^{t-1}}(Y|X) = \left[ P_{M^{t-1}}(\hat{Y}_1|X), \ldots, P_{M^{t-1}}(\hat{Y}_S|X), 1 - \sum_{s=1}^{S} P_{M^{t-1}}(\hat{Y}_S|X) \right], \quad (2)$$

where $\{\hat{Y}_s\}_{s=1}^S$ are the top S most probable predictions of label sequence from $M^{t-1}$. In this way, the output from the CRF of $M^{t-1}$ becomes tractable. However, $M^t$ still cannot be trained with such an output from $M^{t-1}$. This is because $M^{t-1}$ was not trained with the new classes in $D^t$. Therefore, when X is from $D^t$, $M^{t-1}$ will have wrong predictions on the tokens labeled as from entities belonging to new classes. In order to distill with $M^{t-1}$, the model trainer 120 uses a label correction for $\{\hat{Y}_s\}_{s=1}^S$. FIG. 6 shows an example of such a process. Specifically, on the positions of the sequence where $D^t$ has labeled as new classes, the model trainer 120 replaces the predictions in $\{\hat{Y}_s\}_{s=1}^S$ with the annotations from $D^t$. In the example of FIG. 8, the original model 110 is not able to recognize time. Thus, the output predictions 615 do not correctly label 1990 as a time. The annotation process adds the time label to the spot in the label sequence that corresponds with 1990. This produces an annotated label set 625 that can be used to train the updated model 130. The correct set of predictions is denoted as $\{\hat{Y}_s^c\}_{s=1}^S$. For training of $M^t$, the technology described herein first calculates the predicted distribution of $M^t$ with respect to $\{Y_s^c\}_{s=1}^S$, $$\hat{P}_{M^t}(Y|X) = \left[ P_{M^t}(\hat{Y}_1^c|X), \ldots, P_{M^t}(\hat{Y}_S^c|X), 1 - \sum_{s=1}^{S} P_{M^t}(\hat{Y}_s^c|X) \right], \quad (3)$$

where the predicted probabilities are computed from $M^t$ with regard to $\{Y_s^c\}_{s=1}^S$ from $M^{t-1}$.

Then, $M^t$ can be trained by minimizing the cross entropy between $\hat{P}_{M^{t-1}}(Y|X)$ and $\hat{P}_{M^t}(Y|X)$, $$L^{nr}(D^t; M^{t-1}) = -\frac{1}{|D^t|} \sum_{X \in D^t} CE(\hat{P}_{M^{t-1}}(Y|X), \hat{P}_{M^t}(Y|X)), \quad (4)$$

where $CE(\bullet, \bullet)$ is the cross entropy function.

A separate approach is used for distillation from $D_r^t$. Different from data from $D^r$, in which known tokens annotated as O are not from the new classes, data from $D_r^t$ is reconstructed from $M^{t-1}$ and only contains labels from the previous classes. Any token predicted with "O" from $M^{t-1}$ can be potentially labeled as O or in one the new classes in $M^t$. Therefore, with $D_r^t$ it is a challenge to correct the output of the CRF from $M^{t-1}$ for training of $M^t$. To address this challenge the model trainer 120 computes the marginal probability distribution for each token from the CRF with the forward and backward method. For each token with embedding e, let $p_e^t = [p_{e,O}^t; p_{e,C^{t-1}}^t; p_{e,c^t}^t]$ and $p_e^{t-1} = [p_{e,O}^t; p_{e,C^{t-1}-1}^t]$ be the predicted label distribution from $M^t$ and $M^{t-1}$. $p_{e,O}^t, p_{e,O}^{t-1} \in \mathbb{R}$ are the probabilities for class O, whereas $p_{e,C^{t-1}}^t p_{e,C^{t-1}}^{t-1} \in \mathbb{R}^{C^t}$ are the probabilities for entity classes encountered up to step t−1. Further, $p_{e,c^t}^t \in \mathbb{R}^{C^t}$ are probabilities for the new classes in step t. Since O from step t−1 corresponds to the O and the $c^t$ new classes in step t, the technology described herein first collapses $p_e^t$ by computing $\hat{p}_e^t = [\text{sum}(p_{e,O}^t, p_{e,c^t}^t); p_{e,C^{t-1}-1}^t]$, where the technology described herein merges the predictions of O and $c^t$ new classes. In this way, $\hat{p}_e^t$ will have the same dimension as $p_e^{t-1}$. Let $E_r^t$ be the set of token embeddings for all tokens contained in $D_r^t$. The distillation loss for $D_r^t$ is $$L^{syn}(D_r^t) = \mathbb{E}_{e \in E_r^t} KL(\hat{p}_e^t \| p_e^{t-1}), \quad (5)$$

where $KL(\bullet \| \bullet)$ is the KL divergence.

The general objective of $M^t$ for training at step t is given by $$L^t = L^{real}(D^t) + \alpha L^{syn}(D_r^t) \quad (6)$$

where $L^{real}$ and $L^{syn}$ corresponds to distillation with the real data in $D^t$ and synthetic data in $D_r^t$, respectively, and a is a parameter balancing between the losses for $D^t$ and $D_r^t$. In one aspect, $\alpha$ is set to 1, but other values are possible.

The model inversion component 122 generates synthetic training data from the original model 110. Given a randomly sampled label sequence Y containing the old entity classes from $\{D^k\}_{k<t}$, the model inversion component 122 reconstructs the embedding sequence E corresponding to its training data. In other words, the model inversion component 122 generates an embedding for each label sequence that would produce the sequence when the embedding is processed by the CRF. In doing so, the model inversion component 122 randomly initializes embeddings E, then optimizes the parameters of E with gradient descent so that its output with $M^{t-1}$ matches the expected label sequence Y. Formally, E is optimized by minimizing the training loss of CRF, $$L^{crf} = -\log P_{M^{t-1}}(Y|E). \quad (7)$$

The resulting synthetic E may be further optimized by encouraging the synthetic data to be more realistic by leveraging the real data from $D^t$. Let $h^{l,syn}(E_r^t)$ be the hidden state from the $l^{th}$ layer of the BERT encoder in $M^{t-1}$, regarding the set of synthetic token embeddings. $E_r^t$, from $D_r^t$. Similarly, let $h^{l,real}(emb(X^t))$ be the output hidden states from the $l^{th}$ layer of $M^{t-1}$, regarding the set of real tokens, $X^t$, from $D_r^t$. Moreover, emb(•) is the embedding layer. The technology described herein adversarially matches $h^{l,syn}(E_r^t)$ and $h^{l,real}(emb(X^t))$ so that hidden states from the real and synthetic are not far away from each other. In this way, the reconstructed embeddings from $D_r^t$ are more realistic. Specifically, let $M^l$ be a binary discriminator module, i.e., one layer linear projection with sigmoid output, whose inputs are the real and synthetic the hidden states, $$M^* = \text{argmin}_{M^l} -\mathbb{E}_{h \in h^{l,syn}(E_r^t)} \log M(h) - \mathbb{E}_{h \in h^{l,real}(emb(X^t))} \log(1 - M(h)), \quad (8)$$

$$L_{adv}^l = \mathbb{E}_{h \in h^{l,syn}(E_r^t)} \log(1 - M^*(h)) \quad (9)$$

Consequently, the final loss for reconstructing $D_r^t$ is $$L^r = L^{crf} + \beta L^{adv}, \quad (10)$$

where $L^{adv} = \Sigma_{l \in l^*} L_{adv}^l$. 1 is =2, 4, . . . , 12, i.e., the technology described herein matches every two layers of the BERT encoder in $M^{t-1}$. β is a balancing parameter that may be set to 10 in some instances. Good experimental results were achieved with β set to 10, but other use of other values are also possible. For example, the use of values between 1 and 16 showed reasonable performance. Since $M^t$ is trained with the reconstructed tokens from $M^{t-1}$, the technology described herein freezes the BERT token embedding layer during training, so the $M^{t-1}$ and $M^t$ can interpret the token embeddings in the same way. This is also reasonable for the setting of few-shot learning, since tuning all the model parameters with few samples may result in overfitting.

The technology described accounts for different sets of entities classes in the real and synthetic data. The real data $D^t$ and synthetic data $D_r^t$ may contain different sets of entity classes, i.e., the few-shot dataset $D^t$ may not contain entities of old classes in $D_r^t$. In this case, for the token embeddings of old classes in $D_r^t$ s.t., $\{e_{i,j}|y_{i,j}^{t,r} \neq O\}$, matching the hidden states of these embeddings with those from $D^t$ may prevent these embedding from being optimized into the entities of old classes. Therefore, the technology described herein overloads the definition of $E_r^t$ in (5) by preventing embeddings of the old entity classes in $D_r^t$ from matching. i.e., $E_r^t = \{e_{i,j}|y_{i,j}^{t,r} = O\}$, while $X^t$ contains all the real tokens from $D^t$. Algorithm 1, shown in Table 1 below, shows a procedure for constructing $D_r^t$.

Since $D_r^t$ contains entities of old classes from previous steps, distilling with $L^{syn}(D_r^t)$ will help preserve knowledge of old entity classes, i.e., avoiding catastrophic forgetting, without accessing the real data training data from previous training efforts, such as the original training. Additionally, with $D_r^t$, $M^t$ is no longer trained with only a few samples from $D^t$, thus the training is less likely to overfit. This is because $D_r^t$ can construct a relative larger scale, e.g., several hundred sentences, within a computation limit. Compared with training only with $D^t$, $D_r^t$ provides more diverse text information for $M^t$ during training. Moreover, the entity of old classes from $D_r^t$ can be regarded as negative samples for training of the new classes in $D^t$, reducing the confusion between old and new classes for $M^t$ during training.

TABLE 1

Algorithm 1: Algorithm for constructing $D_r^t$ from $M^{t-1}$.

Input: Model from the previous step, $M^{t-1}$, set of old classes up to t − 1, V = $\{v_i\}_{i=1}^{c^{t-1}}$
Output: The reconstructed data $D_r^t$.
$D_r^t = \emptyset$
for v in V do
   for i in 1 ... N do
      Uniformly sample $n_e \in [1, n_e^{max}]$.
      Uniformly sample $n_s \in [n_e, n_s^{max}]$.
      Uniformly sample $k \in [1, n_s - n_e + 1]$.
      Construct a target label sequence Y of length $n_s$, with a length $n_e$ entity of class v starting from position k.
      Randomly initialize an embedding sequence E of length $n_s$.
      while not converge do
         Update E with (10)
      end while
      Add {E, Y} to $D_r^t$.
   end for
end for Exemplary Methods Now referring to FIGS. 7-9, each block of methods 700, 800, and 900, described herein, comprises a computing process that may be performed using any combination of hardware, firmware, and/or software. For instance, various functions may be carried out by a processor executing instructions stored in memory. The methods may also be embodied as computer-usable instructions stored on computer storage media. The method may be provided by a standalone application, a service or hosted service (standalone or in combination with another hosted service), to name a few. In addition, methods 700, 800, and 900 are described, by way of example, with respect to the model trainer 120 of FIG. 1 and additional features of FIGS. 2-6. However, these methods may additionally or alternatively be executed by any one system, or any combination of systems, including, but not limited to, those described herein.

Figure 7:
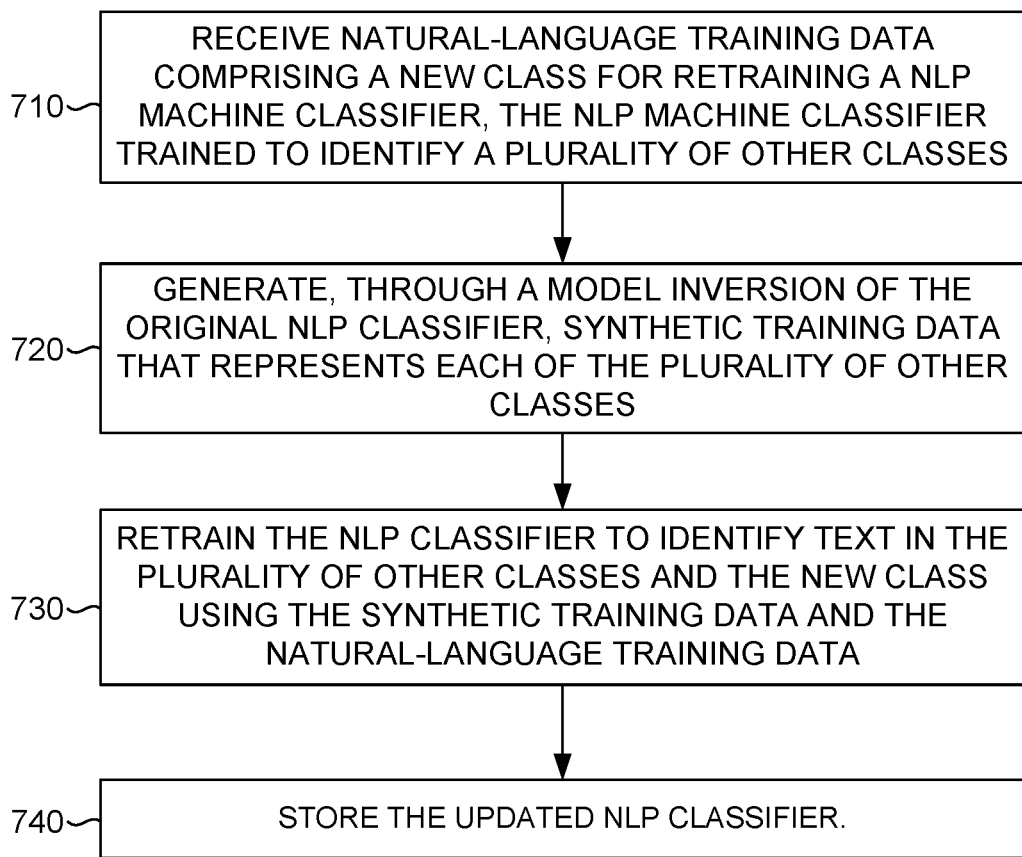
FIG. 7 provides an example method of training a machine classifier to learn a new class, in accordance with embodiments of the technology described herein.

FIG. 7 is a flow diagram showing a method 700 for training a natural-language-processing (NLP) machine classifier to recognize a new class of object, in accordance with some embodiments of the present disclosure. The method 700, at block 710 includes receiving natural-language training data comprising a new class for retraining a NLP machine classifier. The NLP machine classifier is originally trained to identify a plurality of other classes. In aspects, the new class is not in the plurality of other classes. The existing machine classifier may be trained to identify a first plurality of classes from conventional training data. The conventional training data may include a sentence with a training label that associates words in the sentence with no class or one of the classes in the first plurality of classes. Once trained, the initial version of the machine classifier is able to classify words in unlabeled sentences into the plurality of classes. The conventional training data may include a large number of training instances for each class to be learned. For example, the conventional training data may include thousands of instances of training data, including hundreds of examples for each class. The training data for the new class may also be natural language training data comprising a sentence and a label for words in the sentence. However, the training data for the new class may be few-shot training and comprise only 5, 10, 15, 20, or 25 training data instances. The training data for the new class may include labels for the new class and other classes.

The method 700, at block 720 includes generating, through a model inversion of the original NLP classifier, synthetic training data that represents each of the plurality of other classes. To target the problem of catastrophic forgetting in continual few-shot learning, the technology described herein reconstructs synthetic training data of the old classes from the NER model. Constructing synthetic training may eliminate the need to access or store the original training data. The synthetic training data may comprise a representative number of training instances for each existing class. The technology described herein may generate synthetic data samples of old classes by inverting the NER model. Specifically, given the previous model that has been trained on the old classes, the token embeddings of the synthetic data are optimized so that its prediction from the previous model contains the old entity classes. To ensure the reconstructed data is realistic (meaning it replaces actual training data), the technology described herein adversarially matches the hidden features of tokens from the synthetic data and those from the training text of new classes. In addition, since the reconstructed data from a model trained with only few samples are noisy, data selection on the reconstructed dataset is conducted to ensure its quality. By the framework, the technology described herein trains the NER model with annotations of the new classes, while distilling from the previous model with both the synthetic data and real text from the new training data The method 700, at block 730 includes retraining the NLP classifier to identify text in the plurality of other classes and the new class using the synthetic training data and the natural-language training data. The model training may occur through a distillation process. The distillation process may feed the synthetic embeddings into the original model and the updated model being trained. The updated model is trained by updating the parameters of the updated model until the loss measured between the result of the original model and the updated model is minimized. In other words, the updated model is trained to produce a label sequence similar to that produced by the original model in response to the synthetic embedding. The process is repeated with the natural language training data, which is input to both models. The updated model is trained to reduce differences between the output generated by the two models in response to the natural language data.

The method 700, at block 740 includes storing the updated NLP classifier. The NLP classifier may be stored in computer memory for use classifying text.

FIG. 8 is a flow diagram showing a method 800 for using a natural-language-processing (NLP) machine classifier to classify a textual object, in accordance with some embodiments of the present disclosure. The method 800, at block 810 includes receive a textual content. The textual content could be a document, webpage, article, social media post, email, or the like.

The method 800, at block 820 includes assigning a first class to a first word in the textual content using a classification model that is trained to recognize the first class using synthetic training data. The synthetic training data may comprise an embedding and a label. The synthetic training data may comprise a representative number of training instances for each existing class. The technology described herein may generate synthetic data samples of old classes by inverting the NER model. Specifically, given the previous model that has been trained on the old classes, the token embeddings of the synthetic data are optimized so that its prediction from the previous model contains the old entity classes. To ensure the reconstructed data is realistic (meaning it replaces actual training data), the technology described herein adversarially matches the hidden features of tokens from the synthetic data and those from the training text of new classes. In addition, since the reconstructed data from a model trained with only few samples are noisy, data selection on the reconstructed dataset is conducted to ensure its quality. By the framework, the technology described herein trains the NER model with annotations of the new classes, while distilling from the previous model with both the synthetic data and real text from the new training data. Training with the synthetic training data may include distillation training.

The method 800, at block 830 includes assigning a second class to a second word in the textual content using the classification model that is trained to recognize the second class from natural language training data. The natural language training data may comprise a sentence and label. The label may identify a ground truth class for entities in the sentence.

The method 800, at block 840 includes causing the classification model to output a first indication that the first word belongs to the first class and a second indication that the second word belongs to the second class. The output may be through graphical user interface.

Figure 9:
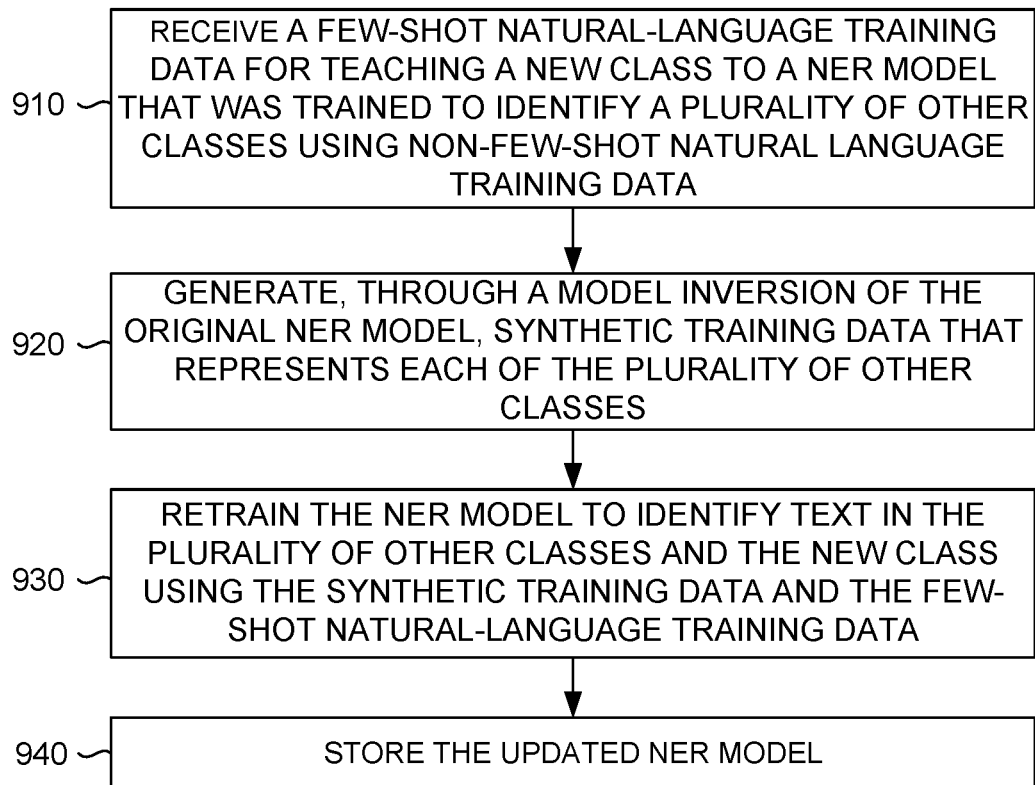
FIG. 9 provides an example method of training a machine classifier to learn a new class, in accordance with embodiments of the technology described herein.

FIG. 9 is a flow diagram showing a method 900 for training a natural-language-processing (NLP) machine classifier to recognize a new class of object, in accordance with some embodiments of the present disclosure. The method 900, at block 910 includes receiving a few-shot natural-language training data for teaching a new class to a NER model that was trained to identify a plurality of other classes using non-few-shot natural language training data.

The method 900, at block 920 includes generating, through a model inversion of the original NER model, synthetic training data that represents each of the plurality of other classes. The synthetic training data may comprise a representative number of training instances for each existing class. The technology described herein may generate synthetic data samples of old classes by inverting the NER model. Specifically, given the previous model that has been trained on the old classes, the token embeddings of the synthetic data are optimized so that its prediction from the previous model contains the old entity classes. To ensure the reconstructed data is realistic (meaning it replaces actual training data), the technology described herein adversarially matches the hidden features of tokens from the synthetic data and those from the training text of new classes. In addition, since the reconstructed data from a model trained with only few samples are noisy, data selection on the reconstructed dataset is conducted to ensure its quality. By the framework, the technology described herein trains the NER model with annotations of the new classes, while distilling from the previous model with both the synthetic data and real text from the new training data The method 900, at block 930 includes retraining the NER model to identify text in the plurality of other classes and the new class using the synthetic training data and the few-shot natural-language training data. The model training may occur through a distillation process. The distillation process may feed the synthetic embeddings into the original model and the updated model being trained. The updated model is trained by updating the parameters of the updated model until the loss measured between the result of the original model and the updated model is minimized. In other words, the updated model is trained to produce a label sequence similar to that produced by the original model in response to the synthetic embedding. The process is repeated with the natural language training data, which is input to both models. The updated model is trained to reduce differences between the output generated by the two models in response to the natural language data.

The method 900, at block 940 includes storing the retrained NER model.

Exemplary Operating Environment

Figure 10:
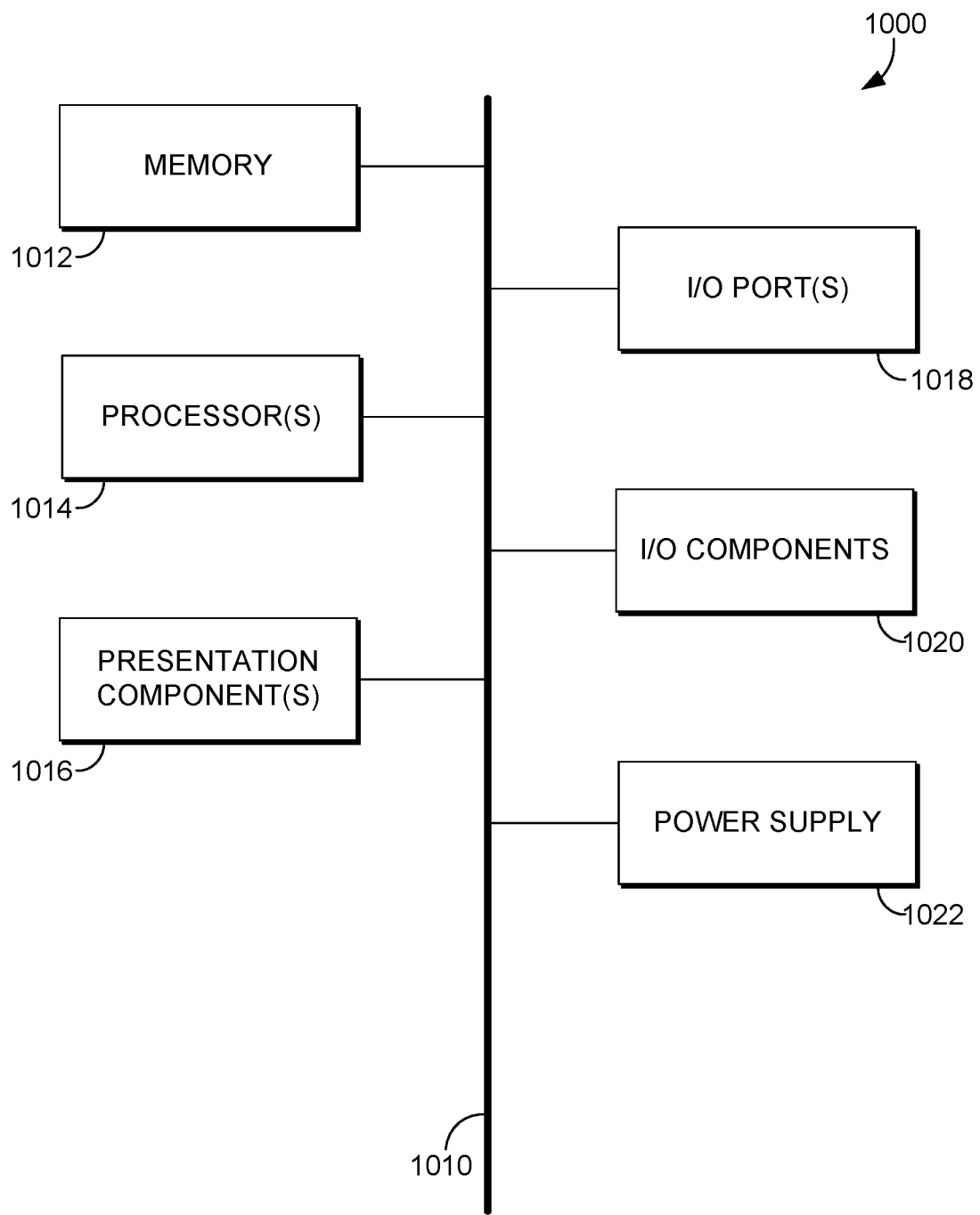
FIG. 10 is a block diagram of an example computing environment suitable for use in implementing embodiments of the technology described herein.

Having briefly described an overview of embodiments of the present invention, an example operating environment in which embodiments of the present invention may be implemented is described below in order to provide a general context for various embodiments of the present invention. Referring initially to FIG. 10 in particular, an example operating environment for implementing embodiments of the present invention is shown and designated generally as computing device 1000. Computing device 1000 is but one example of a suitable computing environment and is not intended to suggest any limitation as to the scope of use or functionality of the invention. Neither should computing device 1000 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 10, computing device 1000 includes bus 1010 that directly or indirectly couples the following devices: memory 1012, one or more processors 1014, one or more presentation components 1016, input/output ports 1018, input/output components 1020, and illustrative power supply 1022. Bus 1010 represents what may be one or more buses (such as an address bus, data bus, or combination thereof). The various blocks of FIG. 10 are shown with lines for the sake of conceptual clarity, and other arrangements of the described components and/or component functionality are contemplated. For example, one may consider a presentation component such as a display device to be an I/O component. In addition, processors have memory. Such is the nature of the art, and reiterate that the diagram of FIG. 10 is merely illustrative of an example computing device that can be used in connection with one or more embodiments of the present invention. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may include computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, vibrating component, etc.

I/O ports 1018 allow computing device 1000 to be logically coupled to other devices including I/O components 1020, some of which may be built in. Illustrative components include a microphone, joystick, game pad, satellite dish, scanner, printer, wireless device, etc.

With reference to the technical solution environment described herein, embodiments described herein support the technical solution described herein. The components of the technical solution environment can be integrated components that include a hardware architecture and a software framework that support constraint computing and/or constraint querying functionality within a technical solution system. The hardware architecture refers to physical components and interrelationships thereof, and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low-level functions relating, for example, to logic, control and memory operations. Low-level software written in machine code can provide more complex functionality to higher levels of software. As used herein, computer-executable instructions includes any software, including low level software written in machine code, higher level software such as application software and any combination thereof. In this regard, the system components can manage resources and provide services for system functionality. Any other variations and combinations thereof are contemplated with embodiments of the present invention.

By way of example, the technical solution system can include an API library that includes specifications for routines, data structures, object classes, and variables may support the interaction between the hardware architecture of the device and the software framework of the technical solution system. These APIs include configuration specifications for the technical solution system such that the different components therein can communicate with each other in the technical solution system, as described herein.

The technical solution system can further include a machine-learning system. A machine-learning system may include machine-learning tools and training components. Machine-learning systems can include machine-learning tools that are utilized to perform operations in different types of technology fields. Machine-learning systems can include pre-trained machine-learning tools that can further be trained for a particular task or technological field. At a high level, machine learning is a field of study that gives computers the ability to learn without being explicitly programmed. Machine learning explores the study and construction of machine-learning tools, including machine-learning algorithm or models, which may learn from existing data and make predictions about new data. Such machine-learning tools operate by building a model from example training data in order to make data-driven predictions or decisions expressed as outputs or assessments. Although example embodiments are presented with respect to a few machine-learning tools, the principles presented herein may be applied to other machine-learning tools. It is contemplated that different machine-learning tools may be used, for example, Logistic Regression (LR), Naive-Bayes, Random Forest (RF), neural networks (NN), matrix factorization, and Support Vector Machines (SVM) tools may be used for addressing problems in different technological fields.

In general, there are two types of problems in machine-learning: classification problems and regression problems. Classification problems, also referred to as categorization problems, aim at classifying items into one of several category values (for example, is this email SPAM or not SPAM). Regression algorithms aim at quantifying some items (for example, by providing a value that is a real number). Machine-learning algorithms can provide a score (e.g., a number from 1 to 100) to qualify one or more products as a match for a user of the online marketplace. It is contemplated that cluster analysis or clustering can be performed as part of classification, where clustering refers to the task of grouping a set of objects in such a way that objects in the same group (called a cluster) are more similar (in some sense) to each other than to those in other groups (clusters). It is a main task of exploratory data mining, and a common technique for statistical data analysis, used in many fields, including pattern recognition, image analysis, information retrieval, bioinformatics, data compression, computer graphics and machine learning.

Machine-learning algorithms utilize the training data to find correlations among identified features (or combinations of features) that affect an outcome. A trained machine-learning model may be implemented to perform a machine-learning operation based on a combination of features. An administrator of a machine-learning system may also determine which of the various combinations of features are relevant (e.g., lead to desired results), and which ones are not. The combinations of features determined to be (e.g., classified as) successful are input into a machine-learning algorithm for the machine-learning algorithm to learn which combinations of features (also referred to as "patterns") are "relevant" and which patterns are "irrelevant." The machine-learning algorithms utilize features for analyzing the data to generate an output or an assessment. A feature can be an individual measurable property of a phenomenon being observed. The concept of feature is related to that of an explanatory variable used in statistical techniques such as linear regression. Choosing informative, discriminating, and independent features is important for effective operation of the machine-learning system in pattern recognition, classification, and regression. Features may be of different types, such as numeric, strings, and graphs.

The machine-learning algorithms utilize the training data to find correlations among the identified features that affect the outcome or assessment. The training data includes known data for one or more identified features and one or more outcomes. With the training data and the identified features the machine-learning tool is trained. The machine-learning tool determines the relevance of the features as they correlate to the training data. The result of the training is the trained machine-learning model. When the machine-learning model is used to perform an assessment, new data is provided as an input to the trained machine-learning model, and the machine-learning model generates the assessment as output.

Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments that are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method comprising:
receiving a few-shot natural-language training data comprising a new class for retraining an original Named Entity Recognition (NER) model, the NER model trained to identify a plurality of other classes using non-few-shot natural language training data;
generating, through a model inversion of the original NER model, synthetic training data that represents each of the plurality of other classes; and
forming a retrained NER model by retraining the original NER model to identify text in the plurality of other classes and the new class using the synthetic training data and the few-shot natural-language training data, wherein the retrained NER model is trained through a distillation that uses the original NER model; and
storing the retrained NER model.

2. The computer-implemented method of claim 1, wherein an instance of the synthetic training data includes a machine embedding and a class label.

3. The computer-implemented method of claim 2, wherein the class label includes two or more classes.

4. The computer-implemented method of claim 2, the machine embedding corresponds to a sentence embedding.

5. The computer-implemented method of claim 1, wherein an instance of the few-shot natural-language training data is a text string and an associated class label for one or more words in the text string.

6. The computer-implemented method of claim 1, wherein the training comprises distilling from the original NER model to the retrained NER model NLP classifier by matching a first output class distribution from the original NER model to an output class distribution from the retrained NER model.

7. The computer-implemented method of claim 6, wherein both the synthetic training data and the natural-language training data are used in the distilling.

8. The computer-implemented method of claim 1, wherein the natural-language training data is a few-shot training set comprising 10 of fewer training instances.

9. A system comprising:
a memory component; and
a processing device coupled to the memory component, the processing device to perform operations comprising:
receiving a few-shot natural-language training data for teaching a new class to an original Named Entity Recognition (NER) model that was trained to identify a plurality of other classes using non-few-shot natural language training data;
generating, through a model inversion of the original NER model, synthetic training data that represents each of the plurality of other classes;
forming a retrained NER model by retraining the original NER model to identify text in the plurality of other classes and the new class using the synthetic training data and the few-shot natural-language training data, wherein the retrained NER model is trained through a distillation that uses the original NER model; and
storing the retrained NER model.

10. The system of claim 9, wherein an instance of the synthetic training data includes a machine embedding and a class label.

11. The system of claim 9, wherein the original NER model is not able to recognize the new class.

12. The system of claim 11, wherein the distillation uses both the synthetic training data and the few-shot natural-language training data, wherein the distillation with the few-shot natural-language training data uses only a top threshold amount of label sequence predictions for a given training input in the natural language training set.

13. The system of claim 12, wherein label sequences output by the original NER model are annotated to assign the new class to tokens with a ground truth in the new class.

14. The system of claim 12, wherein a label sequence used in distillation from the synthetic training data comprises marginal label predictions.

* * * * *